United States Patent [19]

Weber et al.

[11] 4,233,496
[45] Nov. 11, 1980

[54] APPARATUS FOR REMOVAL OF RESIDUES BY MEANS OF PYROLYSIS

[75] Inventors: Werner Weber, Emmenbrucke; Hubert Rustler, Lucerne, both of Switzerland

[73] Assignee: Viscosuisse S.A., Emmenbrucke, Switzerland

[21] Appl. No.: 919,895

[22] Filed: Jun. 28, 1978

[30] Foreign Application Priority Data

Aug. 12, 1977 [CH] Switzerland ............... 9891/77

[51] Int. Cl.³ ............................................. H05B 1/00
[52] U.S. Cl. ................................... 219/390; 219/200; 126/343.5 R; 134/38; 134/105
[58] Field of Search ............... 219/389, 390, 406, 200; 134/19, 35, 38, 105; 126/343.5

[56] References Cited

U.S. PATENT DOCUMENTS

| 2,432,868 | 12/1947 | Earl et al. | 134/38 |
| 2,543,297 | 2/1951 | Olmsted | 219/389 |
| 3,011,042 | 11/1961 | Kamborian | 219/200 |
| 3,448,509 | 6/1969 | O'Reilly | 134/19 |
| 3,804,967 | 4/1974 | Werych | 219/390 |
| 3,923,653 | 12/1975 | Lavins, Jr. | 134/19 |

FOREIGN PATENT DOCUMENTS 1220299 1/1967 Fed. Rep. of Germany .
2110865 8/1972 Fed. Rep. of Germany .
2247861 9/1972 Fed. Rep. of Germany .
2512603 3/1975 Fed. Rep. of Germany .

OTHER PUBLICATIONS

Brochure, "Jet Cleaner", Industrievertretungen Hernball K.G., (German), 31/1/77.
"Warmerohre sur den Einsatz in der Glasindustrie", Schubert, Cz-Chemie-Technik, 3. Jahrgang, (1974), Nr. 1, p. 5.
"Warmerohre Senken Energiekosten", Hake Vt-Veefahrenstechnik 11, (1977), Nr. 3, p. 136.
"Heat Pipes: Warmerohre in Europa Ihre Entwicklung und Anwendung", Brost et al., P.513 Maschinenmarkt, Wurzburg 82, (1976) 30.
Bilken, Now: Remove Plastic Deposits from Extruder Parts the Modern Way, SPE Journal, vol. 29, No. 7, Jul. 1973.

Primary Examiner—B. A. Reynolds
Assistant Examiner—Bernard Roskoski
Attorney, Agent, or Firm—Seidel, Gonda, Goldhammer & Panitch

[57] ABSTRACT

A process and apparatus are provided for pyrolysis cleaning of residues from equipment used in the treatment and processing of synthetic materials, particularly synthetic plastics. The process comprises a first stage in which the equipment to be cleaned is heated in a closed chamber in the absence of air at a temperature above the melting point of the synthetic material from which the residue is left, and a second stage in which the equipment is heated at a higher temperature in the presence of air. The apparatus preferably comprises a slightly inclined, substantially horizontal heating chamber including a drain at the lower end for collecting melted residue, a vent for gases distilled from the residue with means for burning such gases, and an air inlet for introducing air to the chamber during the second stage.

5 Claims, 1 Drawing Figure

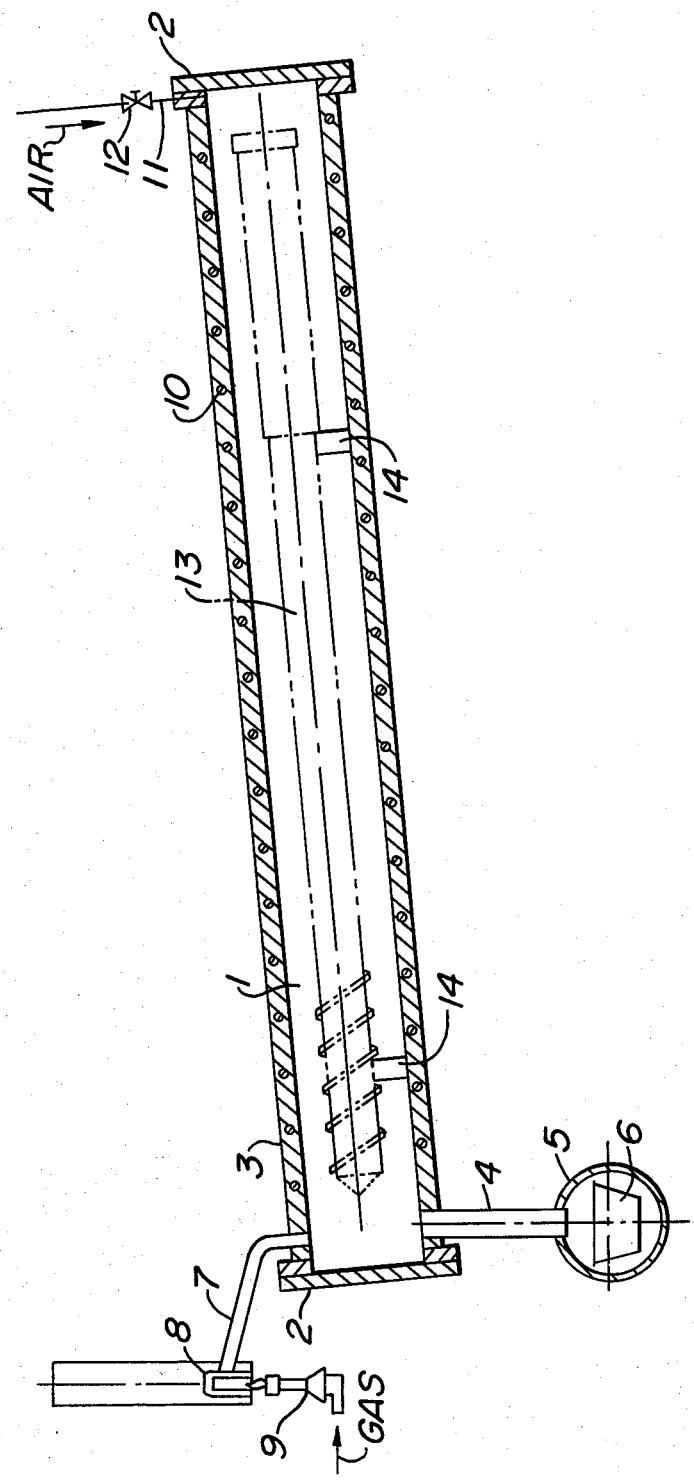

APPARATUS FOR REMOVAL OF RESIDUES BY MEANS OF PYROLYSIS

BACKGROUND OF THE INVENTION

The invention relates to a process and apparatus for the removal of residues from equipment, particularly extruder screws, used in the polymerization and other processing of synthetic materials, such as plastics. More particularly, the invention is directed to the removal of residues by means of pyrolysis in a closed heating chamber provided with at least one exhaust vent for distilled gases.

After brief or extended periods of operation of equipment used in the polymerization and processing of plastics, for example extruder screws, high melting point and non-melting residues remain on the equipment, which residues interfere with production and must be regularly removed. The residues may be removed by brushing or chipping, by burning with liquid fuel, or by treatment in chemical baths. However, the known processes have considerable disadvantages. Thus, the action of cleaning by known processes is too vigorous and too irregular so that there is danger of damage to the surfaces as well as the shape and structure of extruder screws, which are often several meters long.

It is already known that equipment used for holding articles being lacquered may be cleaned by removal of the lacquer residues by means of pyrolysis, i.e., the heating of the equipment in the absence of air. German Pat. No. 1,220,299 issued Jan. 26, 1967 to Siemens A. G. describes such a process and apparatus, according to which the equipment is heated in the absence of air until the lacquer residues are completely burned up and distilled gases may be drawn off through a chimney. The extracting temperature is approximately 650° C. To applicants' knowledge this known process has not yet been used for the handling and treatment of extruder screws.

The apparatus described in German Pat. No. 1,220,299 is improved upon in German Pat. No. 2,247,861 issued May 15, 1975 to Siemens A. G., by making use of the distilled gases to heat the heating chamber. In addition, German Patent Application No. 2,512,603 filed Mar. 21, 1975 by Siemens A. G. describes the introduction of an inert gas, such as nitrogen or carbon dioxide, into the heating chamber to reduce the risk of explosion and to obtain uniform burning.

In another known apparatus which can be used to clean extruder screws, the equipment to be cleaned is heated under vacuum, and the resulting distilled gases are exhausted.

It is the object of the present invention to create a process and apparatus of the type indicated, which are simpler and more economical as well as insuring extremely careful and effective treatment in the removal of residues from equipment being cleaned, particularly extruder screws.

SUMMARY OF THE INVENTION

These and other objectives are met according to the present invention in which a heating chamber with the equipment to be cleaned situated therein is initially heated in the absence of air whereby the distilled gases are burned off and the melted residues of synthetic material are collected, and thereafter air is admitted into the heating chamber and the heating is continued in the chamber at a higher temperature.

In the process of the invention, the partial slow burning or low temperature carbonization by means of pyrolysis is combined with an immediately following melting and collecting of further meltable residues and a mild oxidation through the introduction of air in the final stage of treatment, at which point the bulk of the residues are already removed and the risk of explosion no longer exists. On the basis of this combined process, the heating temperature can be kept relatively low, resulting, for example, in the total elimination of the risk of softening or damage to the hard steel alloy of which the extruder screws are made.

According to the advantageous procedure of the process devised, heating in the absence of air can be maintained at a temperature of about 130° to 170° C. above the melting point of the plastic whose residues are to be removed, and the subsequent heating in the presence of air can be maintained at a temperature about 60° to 100° C. higher, i.e., at a temperature about 190° to 270° C. above the melting point of the plastic. For the period of heating in the absence of air and for the subsequent period of heating in the presence of air, about 1 ¼ to 1 ¾ hours and about ¾ to 1 ¼ hours, respectively, have proved to be especially effective.

To carry out the process of the present invention, an apparatus may be used which comprises a slightly downwardly inclined, substantially horizontal tubular heating chamber which can be sealed gas-tight such as by caps at both ends. At its lower lying end the chamber is provided with a downwardly extending drain pipe with an attached cross tube and a collecting receptacle for melted effluent residues. The heating chamber also includes an upwardly extending exhaust pipe to which are attached a burner and a burner tube for drawing off and burning distilled gases. The tubular heating chamber is surrounded by a casing containing heating elements.

BRIEF DESCRIPTION OF THE DRAWING

For the purpose of illustrating the invention, there is shown in the drawings a form which is presently preferred; it being understood, however, that this invention is not limited to the precise arrangements and instrumentalities shown.

The invention is explained below by way of a single FIGURE which shows a schematic, longitudinal, cross-section view of an inclined tubular heating chamber for carrying out the process of the present invention.

Detailed Description of the Preferred Embodiment

The tubular heating chamber 1 which is slightly inclined to the horizontal is sealed gas-tight at both ends by caps 2. It is provided at its lower lying end with a downwardly extending drain pipe 4 with an attached cross tube 5 containing a collecting receptacle 6 for melted effluent residues. At the top of the lower lying end is an upwardly extending exhaust pipe 7 with an attached burner pipe 8 and burner 9 to draw off and burn distilled gases. At its higher end the chamber is provided with an air intake 11 with a valve 12 for supplying air to the chamber. The tubular heating chamber 1 is enclosed in a casing 3 which contains heating elements 10.

It is especially advantageous to surround the casing 3 with heat insulation (not shown) and to mount the entire apparatus on a portable supporting frame (also not shown). The supporting frame can be used to orient the tubular heating chamber or oven in a horizontal position, in which the long extruder screws can be more easily placed in or removed from the heating chamber. Such an extruder screw 13 is shown in the diagram (in phantom) within the heating chamber, from which it is evident that the extruder screw 13 can be provided with supports 14 so that the extruder screw can be centrally placed in the heating chamber and the liquid residues can flow off easily.

The tubular heating chamber 1 is heated by electrical heating elements which, by way of example, are mounted in the form of multiple band heaters on casing 3. The heating of the chamber 1 should be uniform so that there is no stress or deformation of the extruder screws and so that the residues will be uniformly and rapidly removed. A particularly uniform and very economical heating is possible with the use of heating tubes which consist of evacuated, vacuum sealed and fluid-filled hollow bodies of capillary structure, which are optimally heated electrically, as described, for example, in German Pat. No. 2,110,865. A maximum and totally uniform heating along the entire length of the heating tubes is realized by means of a continuous cycle of heat absorption and heat loss due to evaporation and condensation of the sealed fluid.

The inclination of the tubular heating chamber 1 to the horizontal is approximately 5 to 15 degrees. The temperatures necessary to conduct the process depend on the melting point of the plastic whose residues are to be removed. Generally, the temperatures during the first phase of the process, i.e., during pyrolysis in the absence of air, are about 130° to 170° C. above the melting point of the plastic in question. During the second phase, i.e., during heating in the presence of air, the temperatures are raised by about 60° to 100° C. The period of the first heating phase is on the average about 1 ¼ to 1 ¾ hours, and the period of the subsequent second heating phase is on the average about ¾ to 1 ¼ hours. By using propane gas in the burner 9, the conclusion of the treatment can be recognized by the change of the flame color from red-yellow to blue. The amount of residues flowing into the receptacle 6 during treatment comprises approximately 80% of the total bulk of the removed residues.

The apparatus described above is especially suitable for the removal of residues from extruder screws which are used in the chemical fiber and synthetic material industry in the extrusion of thermoplastic synthetic materials, such as polyamides, polyesters, polyacrylonitriles, polyethylenes, polypropylenes, polystyrenes and polycarbonates. In addition, residues from halogen-containing polymers, such as polyphenyl chloride, can also be removed, but the distilled gases must be conducted to a washing plant to remove the halogen hydrides.

The extruder screws cleaned by the method described above and in the apparatus illustrated are totally free of polymer residues. In case the polymers used contain admixtures of inorganic pigments, for example titanium dioxide, the extruder screws remain covered after the cleaning process with a very thin layer of fine brown powder, which is easily removed by brushing.

As an illustration of the present process as carried out in the described apparatus, there is described below the cleaning of an extruder screw used in the extrusion of polyhexamethyleneadipamide (nylon 66) having a length of 2.4 meters and a diameter of 0.1 meters, which is heavily coated with residues.

The extruder screw mentioned above has two supports and is carefully placed with the aid of a lifting device into a tubular heating chamber 1 as shown in the accompanying drawing, which for this purpose is in a horizontal position. The heating chamber is 3.0 meters long and has an inside diameter of 0.2 meters. Eight electrical band heaters are mounted around the casing 3. The openings to the heating chamber are sealed air-tight with caps 2 at both ends, and the chamber is brought into an inclined position as illustrated in the drawing. Heating of the chamber is begun and the gas flame of burner 9 is lit.

The heating is monitored by thermostat and regulated in such a manner that after approximately 1 hour a temperature of 400° C. is reached, and this temperature is maintained for an additional one half hour. During this one and a half hours, pyrolysis of residues occurs in the absence of air. Then valve 12 is opened and 6 liters of air per minute are introduced into the heating chamber through air intake tube 11 from a pressure cylinder (not shown), while at the same time the temperature is gradually raised to 480° C. In this stage, the remaining residues are oxidized. One hour after the introduction of air, heating and air supply are shut off and the gas flame is extinguished.

Total treatment, therefore, continues for two and one half hours, and the total current consumption is 15 kilowatt hours. After cooling, the heating chamber is once again placed in horizontal position, the caps 2 are removed, and the extruder screw is taken out. Its surface is thereupon totally free of polymer residue. After removal of the collecting receptacle 6 containing the drained off residues, and replacement with a new receptacle, the tubular heating chamber 1 is functionally ready for the next cleaning process.

If the above described process is carried out under otherwise similar conditions except that a heating chamber is used which is heated by means of capillary heating tubes, the current consumption is only about 10 kilowatt hours.

The present invention may be embodied in other specific forms without departing from the spirit or essential attributes thereof and, accordingly, reference should be made to the appended claims, rather than to the foregoing specification as indicating the scope of the invention.

We claim:

1. An apparatus for the removal by means of pyrolysis of residues from equipment used in polymerization and treatment of synthetic materials, comprising a slightly inclined substantially horizontal tubular heating chamber means for sealing against the introduction of gases, including a drain and collecting receptacle at the lower lying end of the heating chamber for collecting melted effluent residues, an outlet vent for removing distilled gases from the heating chamber, means associated with said outlet vent for burning the distilled gases, a valve-controlled air inlet at the higher end of the heating chamber, and heating means surrounding the heating chamber for controlling the temperature therein.

2. Apparatus according to claim 1 wherein said heating means comprises electrical band heaters on the casing of the heating chamber.

3. Apparatus according to claim 1 wherein said heating means comprises fluid-filled capillary heating tubes.

4. Apparatus according to claim 3 wherein said heating tubes are heated electrically.

5. Apparatus according to claim 3 or 4 wherein the heating chamber has a casing of a hollow jacket construction, the inner space of which comprises said capillary heating tubes.

* * * * *